Aug. 9, 1932.　　　T. G. MOULDING　　　1,871,337

AIR CLEANER

Filed July 9, 1930

Inventor

Thomas G. Moulding.

By Charles W. Hills

Patented Aug. 9, 1932

1,871,337

UNITED STATES PATENT OFFICE

THOMAS G. MOULDING, OF CHICAGO, ILLINOIS, ASSIGNOR TO UNITED AIR CLEANER CORPORATION, OF CHICAGO, ILLINOIS, A CORPORATION OF ILLINOIS

AIR CLEANER

Application filed July 9, 1930. Serial No. 466,657.

This invention relates to improvements in air cleaners for removing dust, dirt, and other foreign substances and impurities from air, the invention being highly desirable for use in conjunction with the air intake of internal combustion engines of various types and characters, air compressors, and the like, although the invention has many and varied uses as will be apparent to one skilled in the art.

As is the case in many other industries, the general trend in the air cleaner industry is the development of an air cleaner which is highly efficient in its action and yet exceedingly simple in construction and operation, and one which requires no attention at any time from an operator. In the past, many and various air cleaners have been developed, but were not quite as efficient and simple in construction as is desired. One difficulty exerienced in the development of cleaners heretofore known of the type wherein blades or vanes are utilized to impart a whirling action to the entering air so as to centrifugally separate impurities from the air, lies in the constrution of the blades. In many cases too many blades of too short a length are utilized, and in other cases there are too few blades of greatly distorted configuration. The main object of the blades is to impart a strong whirling action to entering air, and simultaneously direct the air outwardly, so that the maximum whirl occurs just within the casing wall. Some of the cleaners heretofore known have means for properly directing the air, and some have means for giving the desired amount of whirling action, but the happy medium in the number and size of blades which will properly and efficiently afford both advantages has not in most instances been reached. In addition, difficulty has heretofore been experienced in providing the proper opening for the discharge of impurities separated from air by the whirling action, in properly straightening or taking the whirl out of the cleaned air prior to its exit from the casing or cleaner so that all portions of the cleaner are properly coordinated to produce efficient and expeditious results.

In view of the foregoing and many other objections, it is an object of the present invention to provide an air cleaner utilizing blades for imparting a whirling action to entering air, the blades being of the proper number and length for very efficient results.

It is also an object of this invention to provide an air cleaner wherein the means for imparting a whirling action to entering air, the means for discharging impurities carried by incoming air, and the means for straightening the cleaned air prior to its exit from the casing are all properly coordinated to produce a highly efficient result, while the device embodies a construction more simplified than heretofore known.

It is a further object of this invention to provide an air cleaner having an axial outlet for cleaned air and an annular inlet around said outlet, there being blades in the inlet region to impart a whirling action to entering air, these blades being cut with longer edges tangential to the outlet.

Still another object of this invention is the provision of a unit for installation in centrifugal type air cleaners, this unit consisting of a collar of blades with an outlet conduit axially located with respect to the blades and integral therewith, the blades each having an edge thereof cut tangentially to the outlet conduit.

Still another object of this invention is the provision of a centrifugal type air cleaner which is highly efficient in its operation, and simple in construction.

While some of the more salient features, characteristics and advantages of a device embodying this invention have been above pointed out, others will become apparent from the disclosures hereinafter.

The invention includes these and other features of construction and combinations of parts hereinafter described, and shown in a preferred form in the drawing, as more particularly indicated by the claims.

Figure 1:
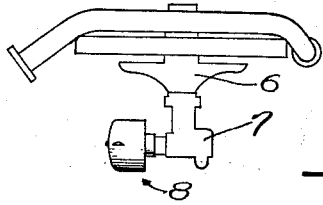
Figure 1 is a diagrammatic elevational view showing a device embodying principles of the present invention attached in operative condition to a carburetor and intake manifold of an internal combustion engine.

In the illustrated embodiment of this invention, as the same as seen in Figure 1, there is shown an intake manifold 6 of an internal combustion engine, to which manifold a carburetor 7 of any desired character is connected, and an air cleaner embodying principles of the present invention generally indicated by reference numeral 8 is connected to the air intake of the carburetor 7. In this instance, the air cleaner is shown mounted in horizontal position, but it is to be understood that the air cleaner forming the subject-matter of this invention may be mounted in any desired position and will function with great efficiency regardless of its angle.

In this instance, the air cleaner 8 embodies a casing 9 having a walled end 10, the opposite end of the casing being open. Mounted in the open end of the casing is a collar of blades or vanes 11 which impart a whirling action to incoming air. Certain of these blades are provided each with an angularly bent portion 12 on the ends thereof, which portions are spotwelded or otherwise secured to the casing 9.

Figure 5:
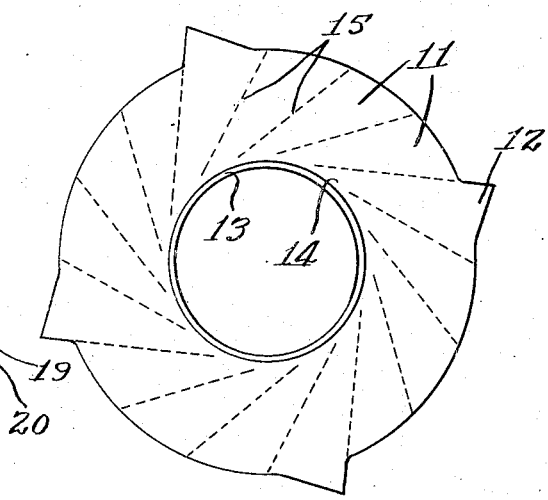
Figure 5 is a diagrammatic view of a portion of the device, illustrating how this particular portion is cut.

The construction of the collar of blades 11 is an important element in the present invention. An entire unit of one piece of sheet metal or other desirable material including the blades 11 and an axial outlet conduit 13 for cleaned air is supported in the front end of the casing by means of the angularly turned portion 12 on certain of the blades. This entire unit is formed preferably by a stamping operation, and in Figure 5 a mongrel pattern of the unit is shown, it being distinctly understood that the entire unit may be formed in one or a plurality of stamping operations, the showing in Figure 5 not being the result of any particular operation but merely for the purpose of clearly showing the cutting of the blades. The blades 11 do not extend inwardly entirely to the outlet conduit 13, but terminate in a relatively smooth annular portion 14 for the purpose of strengthening the single piece unit. As clearly seen in Figure 5, the blades are cut along the dotted lines 15, no metal being removed, and each cut forming opposite edges of adjacent blades. It will be especially noted that the cuts or edges of the blades are tangential to the outlet conduit 13, and by such a cutting operation, a blade of the desired length, not too long or too short, is provided, and fewer blades are necessary than is the case with the commonly known radially extending blades. The blades are twisted somewhat at the region where they connect with the smooth portion 14 so that a part of the blade extends above the plane of the portion 14 and a part of the blade extends below this plane. Obviously, therefore, the blades will impart a distinct whirling action to incoming air and will tend to direct this air towards the casing wall so the maximum whirl will be immediately within the wall of the casing. It will also be noted that all of the blades except those carrying the angular portion 12 therealong terminate short of the casing wall leaving a space 16 between the end of the blade and the casing wall, so that when the air cleaner is mounted in inverted vertical position, heavier dirt particles may drop out of the casing through this space instead of relying upon a sufficient suction in the internal combustion engine to cause the whirling air to carry these portions upwardly into the casing sufficient for them to be discharged through an opening to be later described herein.

After the air is set whirling by its passage through the blades 11, the air will continue to whirl along the inner casing wall toward the closed end 10 and impurities carried by the air will be thrown outwardly adjacent the casing wall by centrifugal force.

Figure 2:
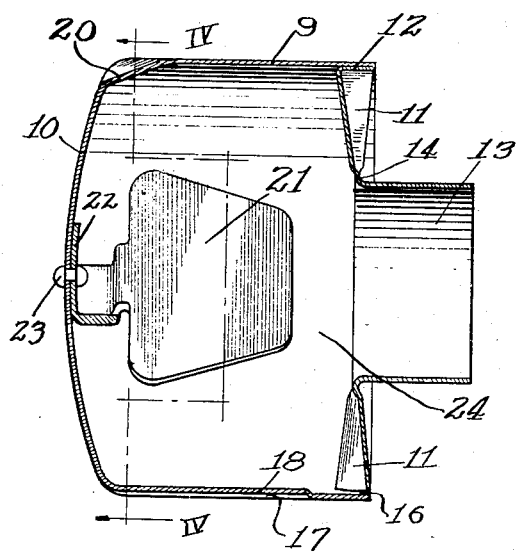
Figure 2 is an enlarged longitudinal vertical section of the device itself.
Figure 3:
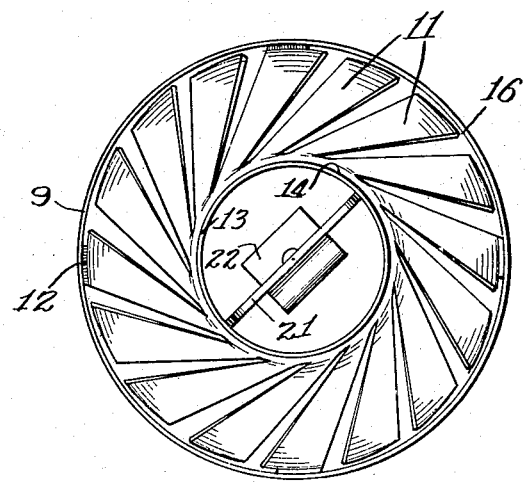
Figure 3 is an end or plan view of the device taken from the right of Figure 2.
Figure 4:
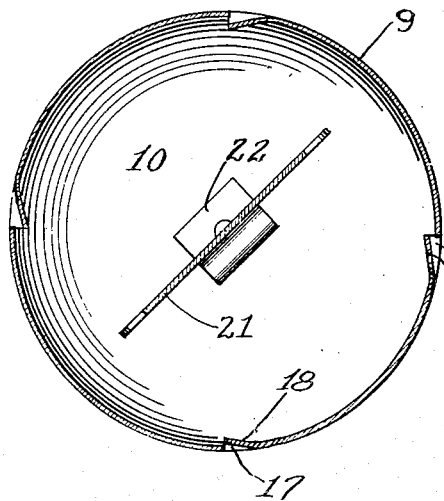
Figure 4 is a vertical sectional view taken substantially as indicated by the staggered section line IV—IV of Figure 2.

As seen more clearly in Figures 2 and 4, the casing is provided with a longitudinal slot 17 extending substantially the entire length of the casing and terminating adjacent the closed end 10 through which impurities are discharged by the action of the whirling air. This slot 17 is formed by making an incision in the casing wall and then pressing inwardly one of the margins of the incision as seen at 18 in Figure 4. The portion 18, therefore, which extends in a direction opposite to the whirl of the air, will function as a skimmer for the removal of the foreign particles carried by the air.

Adjacent the junction of the casing wall and the closed end 10, a plurality of spaced inlet ports or openings 19 are provided by splitting the casing wall and indenting a portion 20 of the casing adjacent to and on one side of each of the slits. It will be noted that the indented portions 20 slope inwardly in a direction opposite to the skimmer 18 so that the whirling air will pass freely over the indentations 20 and not discharge foreign particles through the openings 19. These openings 19, however, afford inlet passages for air and tend to impart a whirling action to air entering therethrough, whereby air will be sucked into the casing through these ports 19 and augment the action of the air already in the casing so that a very strong whirl will be produced adjacent the end wall 10.

Upon reaching the end wall 10 the air must be reversed in direction to enable the same to be sucked out of the outlet conduit 13 by the action of the internal combustion engine. Obviously, if whirling air was sucked out of the cleaner, the air due to its whirling action would tend to choke the carburetor 7 in many instances. To avoid this possibility, an air straightener 21 is provided, this straightener being in the form of a flat blade, preferably of a trapezoidal shape, and provided with an angularly bent portion 22 integral therewith and of a sufficient size to properly space the air straightener from the end wall 10. The angular portion 22 on the straightener is secured to the end wall 10 by means of a rivet 23 or in any other desired manner. It will be noted with reference to Figure 2 that the straightener 21 terminates short of the outlet conduit 13 leaving a distinct space 24 between the outlet conduit and the straightener. The air in the space 24 will be substantially dead, i. e., there will be no whirl in this air and its only motion will be the result of suction in the internal combustion engine. All of the air entering the carburetor 7 will come directly from the central portion 24 wherein the air has been stilled by the straightener, and consequently all possibilities of choking the carburetor by any action on the part of the air cleaner will be avoided.

From the foregoing, it is apparent that I have provided an air cleaner which is highly efficient in operation and exceedingly simple in construction, whereby the same may be very economically manufactured. It is also apparent that the air cleaner hereinabove described includes blades of the proper number and length to properly direct incoming air for best results in cleansing the same. In other words, there is a less number of blades used in the present cleaner than is commonly used in those cleaners having radially extending blades, while the blades are of a greater length than radially extending blades would be, and there are more blades used than in many cases where blades of a somewhat helical form extending longitudinally with the casing are incorporated. It will also be noted that the present invention is easily mounted or installed, and requires no attention whatsoever from an operator.

I am aware that many changes may be made, and numerous details of construction may be varied through a wide range without departing from the principles of this invention, and I, therefore, do not purpose limiting the patent granted hereon, otherwise than is necessitated by the prior art.

I claim as my invention:

1. In a device of the character described, a casing having a walled end and inlet means arranged to impart a whirling action to entering air to separate impurities therefrom, said casing having a longitudinal peripheral slot extending substantially to said walled end for the discharge of said impurities, said casing having a plurality of peripheral inlet openings adjacent said walled end arranged to impart a whirling action to air entering therethrough whereby the whirl is increased adjacent said walled end, said casing having an outlet for cleaned air, and an air straightener in the form of a flat blade disposed adjacent said walled end for takng the whirl out of cleaned air prior to the exit thereof through said outlet.

2. An inlet and outet unit for disposition in centrifugal type air cleaners, said unit comprising a collar of blades terminating in a relatively solid and smooth central ring, an outlet conduit integral with said ring, said blades having edges cut tangential to said conduit, and an angularly disposed portion on the outer end of certain of said blades for mounting said unit.

3. In a device of the character described, a casing having a walled end and an open end, a collar of blades in said open end for imparting a whirling motion to incoming air to separate impurities therefrom, said casing having an outlet opening for clean air through the central portion of said collar, said blades having edges tangential to said opening, said casing having a peripheral longitudinal slot extending substantially to said walled end for the discharge of said impurities, said casing having relatively small inlet openings adjacent said walled end arranged to impart a whirling action to air entering therethrough to increase the whirl in this region of the casing, and an air straightener in the form of a flat blade spaced from said clean air outlet opening for removing the whirl from the air prior to the exit through said outlet opening.

In testimony whereof I have hereunto subscribed my name at Chicago, Cook County, Illinois.

THOMAS G. MOULDING.